May 2, 1933.  P. SPENCE  1,906,652
AUTOMATIC PRESSURE REDUCING VALVE
Filed May 23, 1931
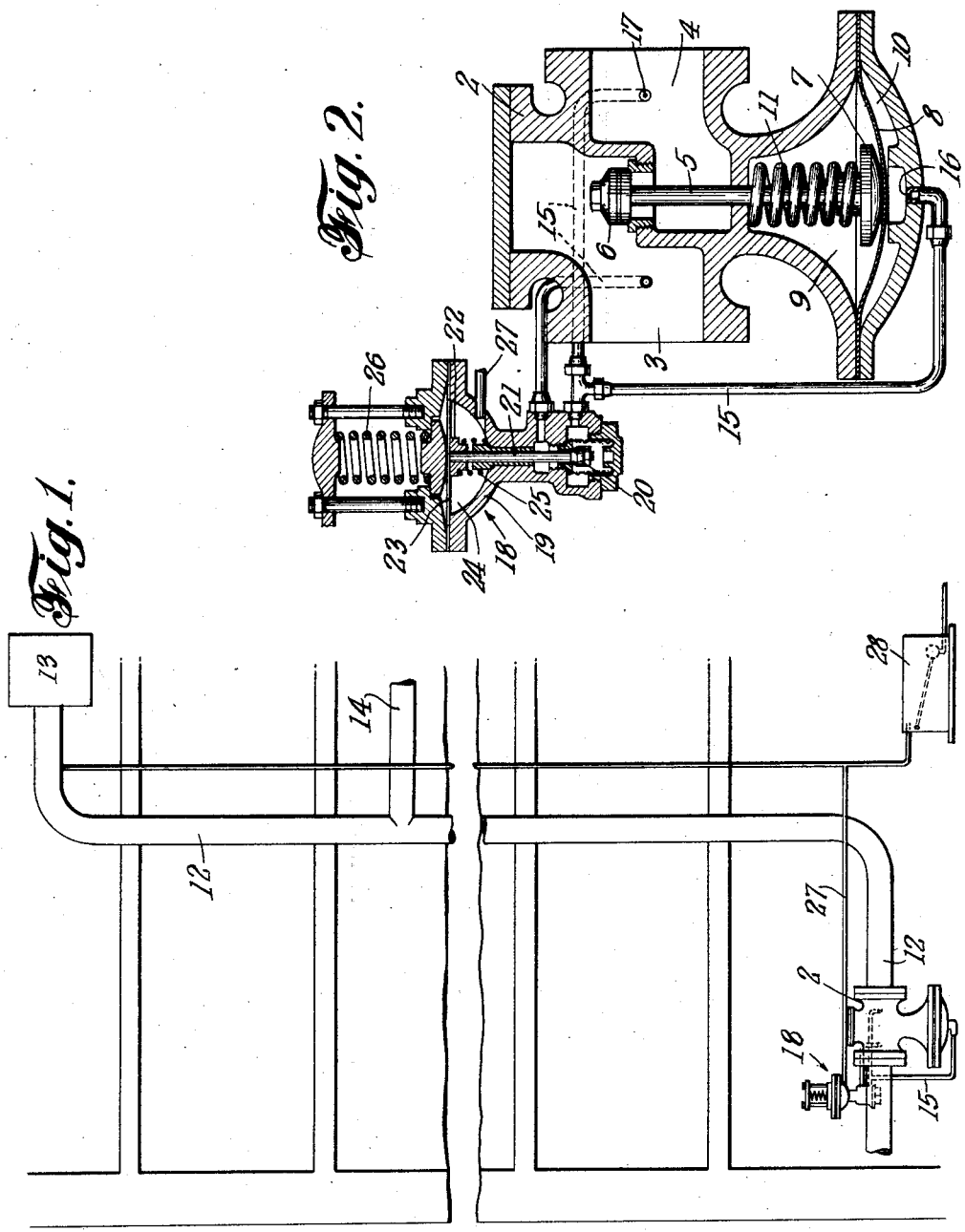
INVENTOR
Paulsen Spence
BY
Mitchell & Bechert
ATTORNEY Patented May 2, 1933

1,906,652

UNITED STATES PATENT OFFICE

PAULSEN SPENCE, OF EAST ORANGE, NEW JERSEY

AUTOMATIC PRESSURE REDUCING VALVE

Application filed May 23, 1931. Serial No. 539,480.

My invention relates to an automatic pressure reducing valve for reducing the pressure of a condensible vapor so as to maintain a constant pressure at a point considerably above the valve.

It is frequently desirable to install a diaphragm-controlled pressure reducing valve in a condensible vapor supply pipe at a considerable distance below the apparatus the vapor pressure in which is to be controlled by the valve. If apparatus in addition to that in which the vapor pressure is to be regulated is also supplied through the same valve, and if the use of electrical methods of controlling the valve is not desired, it is necessary to run a control pipe from the apparatus in which the vapor pressure is to be regulated to the valve for the purpose of automatically controlling the valve. Such a system suffers from the disadvantage that the vapor condenses in the control pipe so that the control pipe becomes filled with condensate. If the valve and the controlled apparatus are some distance apart, as where the valve is placed in the basement of a building and the apparatus is placed on the thirtieth floor, the weight of the condensate which collects in the control pipe may be much greater than the pressure in the apparatus. This requires the use in connection with the valve of a heavier and less sensitive diaphragm, thereby rendering the valve insensitive to small changes in the pressure in the controlled apparatus.

It is an object of my invention to provide a pressure reducing valve for reducing the pressure of a condensible vapor so as to maintain a substantially uniform and predetermined pressure at apparatus located above the valve, without subjecting the diaphragm or other pressure actuated means which controls the operation of the valve to hydrostatic pressure due to the accumulation of condensate in the control pipe leading from the apparatus to the valve.

Briefly stated I achieve this result by placing a trap at a low point in the control pipe leading from the controlled apparatus to the reducing valve so as to remove condensate from the control pipe. Thereby I effectuate a remote control of the reducing valve without subjecting the means which are actuated by the pressure in the control pipe to pressure resulting from the presence of condensate in the control pipe.

Other objects and features of the invention will be pointed out or will become apparent upon a reading of the specification.

In the drawing which shows, for illustrative purposes only, a preferred form of the invention—

Fig. 1 is a view in elevation of a pressure reducing valve embodying features of my invention and shown installed in the basement of a high building;

Fig. 2 is a central sectional view on an enlarged scale of parts of the apparatus shown in Fig. 1.

In the drawing 2 represents the body of a main valve preferably of the type disclosed in my co-pending application Serial No. 366,837, filed May 29, 1929. The body 2 has an inlet chamber 3 and an outlet chamber 4. 5 is a valve stem to which is attached a valve head 6 and a disc 7. Coacting with the disc 7 is a flexible diaphragm 8. The diaphragm is contained in a diaphragm chamber which may be integral with the body 2. The diaphragm divides the diaphragm chamber into two chambers 9 and 10 which, for convenience, I shall term the upper and lower diaphragm chambers respectively. A spring 11 may be placed preferably in one of the diaphragm chambers for the purpose of taking up slack. Communication is provided between the outlet chamber 4 and the diaphragm chamber 9 by loosely fitting the valve stem 5 in the body 2 so that the fluid in the outlet chamber 4 will leak past the valve stem 5 into the diaphragm chamber 9. The outlet side of the valve is connected by a pipe 12 to the controlled apparatus in which the vapor pressure is regulated by the reducing valve. This apparatus is located considerably above the point where the reducing valve is installed. In the specific form shown in the drawing this apparatus is an apparatus 13 which is installed on a high floor of a building. Other apparatus is supplied with vapor through the branch pipe 14. The reducing valve is shown installed in the basement of the same building.

15 is a fluid conducting means leading from the inlet chamber 3 to the diaphragm chamber 10 and also to the outlet chamber 4. The fluid conducting means 15 opens into the diaphragm chamber 10 through a restricted orifice 16 and opens into the outlet chamber 4 through a restricted orifice 17. Interposed in the fluid conducting means 15 is a pilot valve 18. 19 represents the body of the pilot valve. 20 is a valve head and 21 is a valve stem connected to the valve head 20. 22 is a disc connected to the valve stem 21 and which coacts with a flexible diaphragm 23. The diaphragm 23 together with the body 19 form a diaphragm chamber 24. 25 is a light spring which holds the disc 22 in contact with the diaphragm 23. 26 is a comparatively heavy spring which is interposed between the body 19 and the diaphragm 23 for the purpose of moving the diaphragm and the valve stem in the direction to open the pilot valve. 27 is a control pipe leading from the controlled apparatus 13 to the diaphragm chamber 24. 28 is a trap located at a low point in the control pipe 27 for the purpose of removing condensate therefrom.

The operation of the device is as follows—

Let us assume that it is desired to reduce the pressure of steam having a pressure of 100 lbs. per square inch in chamber 3 so as to maintain a pressure of 5 lbs. per square inch in apparatus 13. The spring 26 is adjusted so that its tension will be approximately equal to the pressure on the diaphragm 23 when the vapor pressure in apparatus 13 is 5 lbs. per square inch and when the control pipe 27 is free of condensate. As long as the pressure in apparatus 13 is less than 5 lbs. per square inch the pilot valve 18 will remain open, allowing high pressure fluid from the chamber 3 to pass through the pipe 15 into the diaphragm chamber 10. The high pressure fluid in the diaphragm chamber 10 will act upon the diaphragm 8 so as to hold the main valve open until the pressure in the apparatus 13 reaches 5 lbs. per square inch, at which time the pilot valve will partially close. Thereafter, due to the escape of fluid from the diaphragm chamber 10 to the outlet chamber 4 through the orifices 16–17, the pressure in the diaphragm chamber 10 will be gradually reduced until the pressure in the chamber 9 together with the tension of the spring 11 will operate to partially close the main valve. Thereafter if the pressure in the apparatus 13 drops below 5 lbs. per square inch, the tension of the spring 26 will move the diaphragm 23 against the pressure in the diaphragm chamber 24 so as to cause the pilot valve 18 to open wider. This will cause the pressure in the diaphragm chamber 10 to build up and act upon the diaphragm 8 to cause the main valve to open wider.

It will thus be seen that I have produced a pressure reducing valve for reducing the pressure of a condensible vapor so as to maintain a substantially uniform and predetermined pressure at apparatus located above the valve without subjecting the pressure actuated means which controls the operation of the valve to a hydrostatic pressure due to the accumulation of condensate in the control pipe.

While the invention has been described in considerable detail and a specific form shown in the drawing it is to be understood that the invention may be otherwise embodied and employed in connection with pressure reducing valves of various types other than herein shown.

I claim:

1. An automatic pressure reducing valve for reducing the pressure of a condensible vapor comprising, a main valve for controlling the flow of said vapor to apparatus located above said valve, pressure actuated means for controlling the operation of said main valve, a control pipe leading from said apparatus to one side of said pressure actuated means, and a trap interposed in said control pipe for removing condensate therefrom and substantially preventing escape of condensible vapor, whereby the pressure in said apparatus is automatically controlled without subjecting said pressure actuated means to pressure due to condensate in said control pipe.

2. An automatic pressure reducing valve for reducing the pressure of a condensible vapor comprising, a main valve for controlling the flow of said vapor to apparatus located above said valve, pressure actuated means for operating said main valve, fluid conducting means leading from the inlet chamber of said main valve to one side of said pressure actuated means, an automatic pilot valve for controlling the passage of fluid through said conducting means, pressure actuated means for operating said pilot valve, a control pipe leading from said apparatus to one side of said last mentioned pressure actuated means, and a trap interposed in said control pipe at a low point thereof for removing condensate therefrom and substantially preventing the escape of condensible vapor, whereby the pressure in said apparatus is automatically controlled without subjecting said last mentioned pressure actuated means to pressure due to condensate in said control pipe.

3. In a system of the character indicated, a control valve for condensible vapor, conduit means for conducting the vapor to a point substantially above said control valve, a control pipe extending downwardly from a point in said conduit means substantially above said control valve, means for controlling said control valve by pressure in said control pipe, and means for venting condensate from said control pipe and preventing escape of any substantial quantity of condensible vapor, whereby the control of said control valve will be substantially unaffected by condensate in said control pipe and said control valve will be controlled by the pressure of the vapor at said point of connection to said conduit means.

PAULSEN SPENCE.